E. THOMSON.
SPEED INDICATOR.
APPLICATION FILED MAY 1, 1908.
1,095,131.
Patented Apr. 28, 1914.
3 SHEETS—SHEET 2.
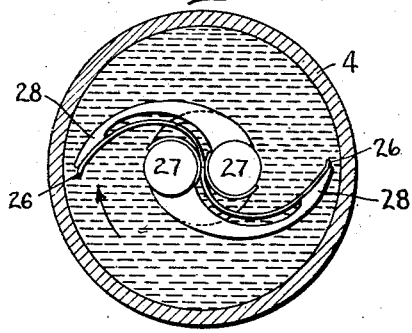
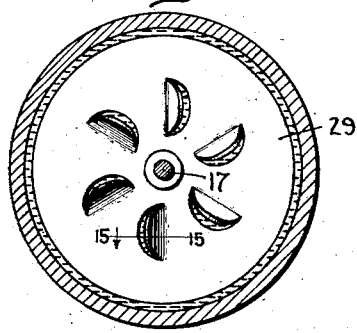
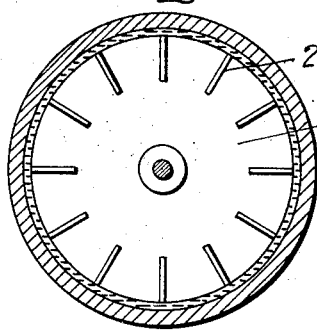
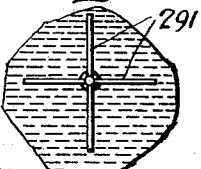
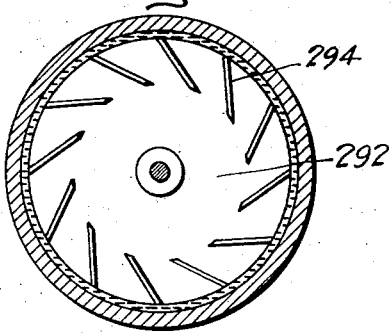
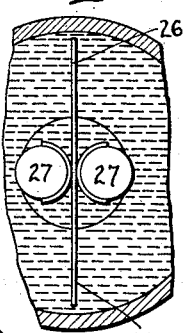
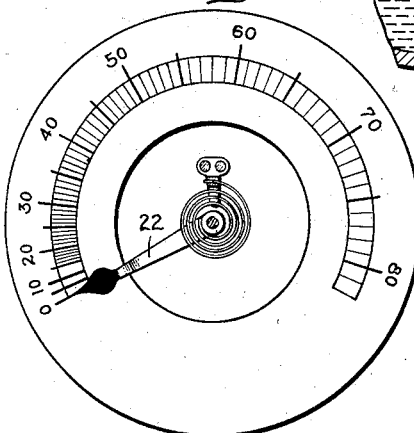
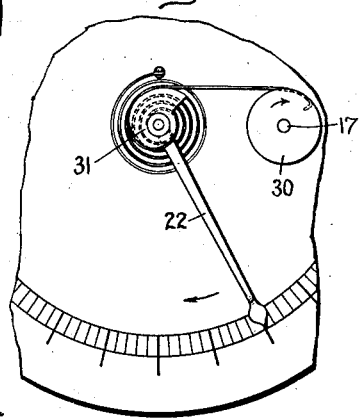
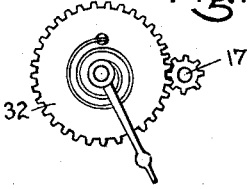
Witnesses:
Inventor,
Elihu Thomson,
By
Att'y E. THOMSON.
SPEED INDICATOR.
APPLICATION FILED MAY 1, 1908.
1,095,131.
Patented Apr. 28, 1914
3 SHEETS—SHEET 3.
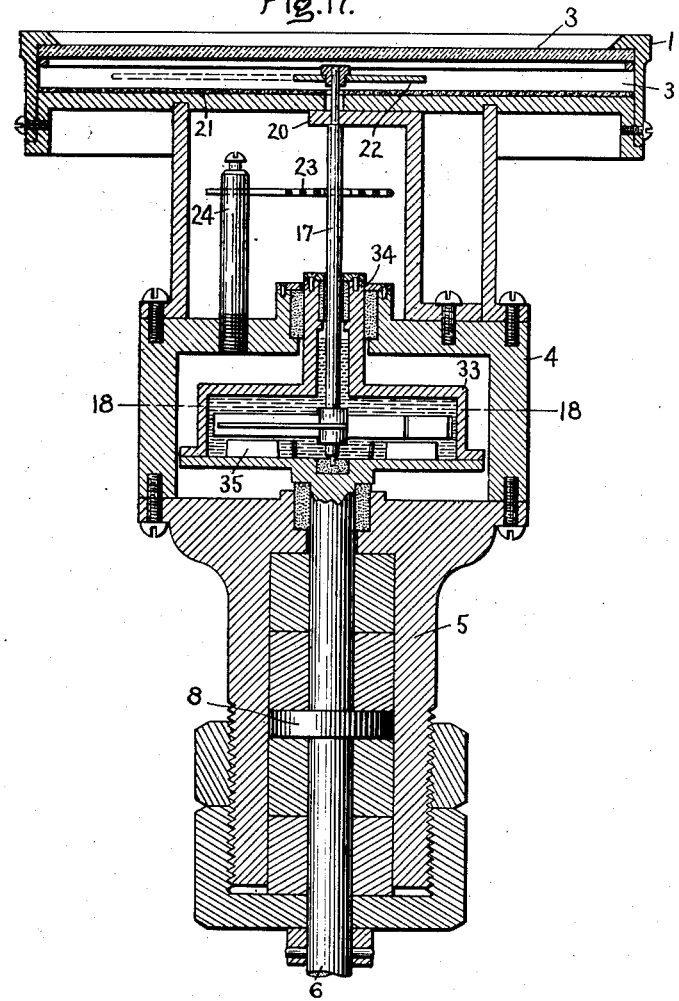
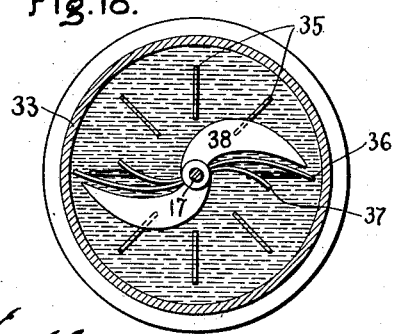
Witnesses:
Inventor,
Elihu Thomson,
By Att'y.

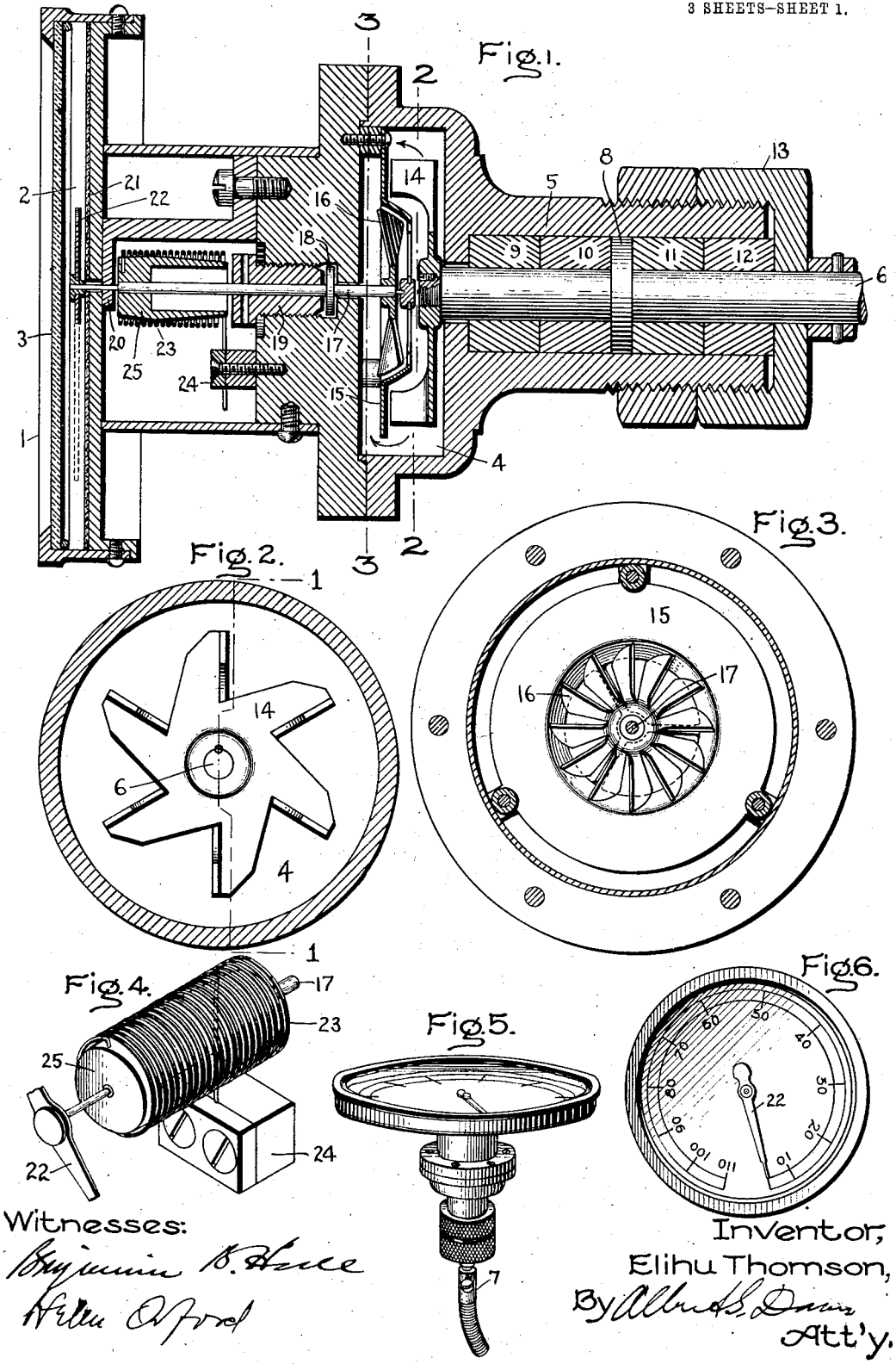

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

SPEED-INDICATOR.

1,095,131.  Specification of Letters Patent.  Patented Apr. 28, 1914.

Application filed May 1, 1908. Serial No. 430,286.

*To all whom it may concern:*

Be it known that I, ELIHU THOMSON, a citizen of the United States, residing at Swampscott, county of Essex, State of Massachusetts, have invented certain new and useful Improvements in Speed-Indicators, of which the following is a specification.

My invention relates to speed indicators or tachometers and more particularly to speed indicators in which an indicating element is rotated against a controlling spring by a torque developed by means of a fluid. Instruments of this type have been used in which air, glycerin or a similar fluid develops a torque tending to move an indicating member against a controlling spring, but such instruments are unreliable and inaccurate because comparatively small changes in temperature cause sufficient changes in the density and viscosity of the fluid to destroy the accuracy of the instrument and also because the scale is irregular and hard to read.

The object of my invention is to produce a speed indicator which is unaffected by changes in temperature, which has a high torque, enabling it to respond quickly and accurately to slight changes in speed, and in which the scale is open and substantially uniform from end to end.

In carrying out my invention, an indicator is moved against a controlling spring by a torque dependent on the speed to be measured and developed on the indicator by means of a fluid which moves relatively to the indicator and tends to carry the indicator along with it. Mercury is preferably used as the fluid in order to reduce the size of the device and to magnify the effects secured, and also to avoid errors due to changes in temperature. The torque on the indicating member is preferably secured by setting the mercury or similar liquid in motion by means of an impeller or set of paddles and causing the moving mercury to move a motor or indicating member against a spring, which holds an index or pointer at zero when the mercury is stationary and permits the index to move over a scale to a distance dependent on the torque exerted on the indicating member. The great density of the mercury causes pronounced effects which are not observable with lighter liquids, such as oil, and the fact that its viscosity changes very little with ordinary changes of temperature such as are met with in practice, reduces the temperature error to a minimum, while troubles from leakage are avoided by making the container for the fluid of some material which the mercury will not wet, since under these conditions the mercury will not leak through the openings which are capillary in size. The scale is rendered uniform either by lessening the efficiency of the mercury in rotating the indicator as the speed rises or else by automatically increasing the effective force of the controlling spring at such a rate that the movement of the indicator is substantially proportional to the speed in spite of the variations in torque.

My invention will best be understood in connection with the accompanying drawings, which are merely illustrative of forms in which the invention may be embodied, and in which—

Figure 1 is a longitudinal sectional view of one form of speed indicator, this section being taken along the line 1—1 of Fig. 2; Fig. 2 is a cross-section on the line 2—2 of the device shown in Fig. 1; Fig. 3 is a cross-section on the line 3—3 of Fig. 1; Fig. 4 is a view in perspective of one type of controlling spring arranged to produce a uniform scale; Fig. 5 shows a complete instrument in isometric projection; Fig. 6 is a plan view of the scale plate showing the practically uniform scale secured by instruments embodying my invention; Fig. 7 is a cross-section of the casing containing a self-adjusting impeller with flexible blades for developing on the indicating member a torque substantially proportional to the speed; Fig. 8 is a cross-section showing one form of torque producing wheel attached to the indicator shaft; Fig. 9 is a plan view of one form of impeller for putting the mercury in motion; Figs. 10 and 11 are plan views of different forms of indicating wheel which may be connected to the indicator shaft; Fig. 12 is a plan view of a scale plate showing the scale when an ordinary volute controlling spring is used; Fig. 13 is a plan view showing the use of a fusee and cam for securing a uniform scale with an ordinary volute spring; Fig. 14 is a plan view of an impeller like that shown in Fig. 7 but without stops for controlling the position of the blades and rotatable in either direction; Fig. 15 is a cross-section of Fig. 8 on the line 15—15 to show the form of the projections on the torque-producing wheel; Fig. 16 shows gearing which permits the indicator shaft to rotate to any extent desired and thereby exert a very strong torque on the controlling spring; Fig. 17 is a longitudinal section of a modified form in which the fluid is contained in a rotatable box; and Fig. 18 is a cross-section on the line 18—18 of Fig. 17.

In the specific form of instrument shown in Fig. 1 of the drawings, a framework 1 carries a scale plate mounted in a casing 2 on the framework and protected by a glass cover 3, as is customary in instruments of this type. The receptacle 4, which contains the mercury or other fluid by means of which a torque is exerted to move an index over the scale, has a journal 5 formed in one wall to carry an impelling shaft 6 which is driven at a speed dependent on the speed to be measured through any suitable connection 7. Endwise motion of the impelling shaft 6 is prevented by a collar 8 firmly mounted on the impelling shaft and held in position between packing and bearing blocks 9, 10, 11 and 12, preferably composed of graphite or similar material soaked in oil and held in position by a suitable nut or cap 13 threaded upon the journal 5. The graphite blocks act as a packing to prevent the escape of mercury and also make a very durable and satisfactory form of bearing.

The impelling shaft 6 puts the liquid in the casing 4 in motion and thereby transmits a torque to the indicating shaft by means of any suitable mechanism, the preferred form of which comprises an impeller 14 provided with rotary vanes or wings which acts like the impeller or a centrifugal pump to cause the fluid in the casing 4 to circulate from the center or intake toward the periphery of the impeller. The circulation of the fluid in the desired manner is assured by means of a thin diaphragm 15 in the form of an annular plate which has an incurved portion extending toward the impeller with an opening in the center directly opposite the center or intake of the impeller, and is mounted, as shown in Fig. 3, on lugs or projections in the casing 4 in such a manner as to leave an annular clearance around the outer periphery of the diaphragm. The circulation of the mercury from the periphery of the impeller through the annular clearance around the outer edge of the diaphragm and back to the intake of the impeller through the central opening of the diaphragm produces a torque on the indicating shaft by acting upon any suitable form of fluid motor connected to the shaft. The preferred type of motor is that shown in the drawing and consists of a motor wheel 16 in the form of a screw propeller mounted upon the indicating shaft 17 with its vanes or blades set at an angle to the direction of flow of the mercury.

Leakage of the fluid from the casing 4 is prevented by using a casing of some material which is not wet by the fluid and by making the openings leading into the casing of capillary size. In the arrangement shown in Fig. 1 the indicating shaft 17, which has its inner pivot carried in a bearing mounted on narrow arms extending across the central opening of the diaphragm 15, passes through an opening in the wall of the casing of such a size that an annular clearance of capillary size is left around the shaft. A collar 18 mounted on the indicating shaft fits loosely in a cylindrical recess in the wall through which the shaft passes, and an adjusting plug 19 through which the indicating shaft extends is screwed into the recess until its inner end coöperates with the collar 18 to make all the clearances around the collar of capillary size. As a result of this construction the mercury in the casing 4 will not leak through the capillary spaces surrounding the indicating shaft and there is no danger of the loss of fluid from the casing.

The outer end of the indicating shaft is supported in a bearing 20 adjacent a scale plate 21 in the casing 2, and carries an index or pointer 22 movable over the scale plate. In order to bring the index or pointer to zero and to resist the torque tending to move the index from zero, a control spring 23 is provided having one end secured to the indicating shaft 17 and the other end held by a fixed abutment or clamp 24. This spring may be either an ordinary coil spring or a spring of the volute type arranged to be wound up as the indicating shaft is turned.

The operation of the device thus far described is as follows: As the impeller 14 is rotated by means of the impelling shaft 6 at a speed dependent on the speed to be measured, the mercury in the casing 4 circulates from the center or intake to the periphery of the impeller, thence through the annular clearance around the outer edge of the diaphragm 15 and back over the blades or vanes of the motor element 16 and through the central opening of the diaphragm to the intake of the impeller. The flow of the mercury over the vanes or blades of the motor wheel 16 tends to turn the wheel and produces a torque tending to rotate the indicating shaft and index and to strain the control spring 23. As the speed of the impelling shaft 6 rises or falls the torque exerted on the motor or screw wheel 16 also rises and falls causing the index 22 to traverse the scale and give varying deflections in accordance with the change in speed. Since the torque exerted on the indicating shaft by the flow of mercury over the screw wheel 16 increases or has a tendency to increase as the square of the speed, while the resistance of the control spring varies only with the position of the indicating shaft, the scale assumes the form shown in Fig. 12 and is cramped at low speeds and opens out more and more as the speed increases. The mercury in flowing over the screw wheel 16 produces a high and steady torque on the indicating shaft, permitting the use of a comparatively strong control spring and producing an accurate and responsive instrument.

In many cases it is desirable to have a speed indicator with an open scale substantially uniform from one end to the other, and in accordance with my invention this result may be produced either by automatically increasing the effective force of the controlling spring at such a rate that the movement of the index becomes approximately proportional to the speed or else by varying the efficiency of the mercury in exerting a torque on the indicating shaft in such a manner that the torque becomes approximately proportional to the speed.

In carrying out the first method, the control spring may be automatically increased in effective force as the speed rises in any suitable way, preferably by automatically shortening the spring as the index moves over the scale. The shortening of the spring may be carried out in many different ways but is preferably accomplished in the manner shown in Fig. 4 in which the control spring 23 is loosely wound over a cylindro-conical body 25 mounted on the indicating shaft 17. By a cylindro-conical body is meant a body centrally mounted upon the shaft, nearly cylindrical at one end and slightly tapering toward the other end as shown in Fig. 4, the nearly cylindrical end having the end of the surrounding cylindrical spring attached thereto while the tapering or conical end extends toward the free portion of the spring carried by the clamp or abutment 24.

In the arrangement shown in Fig. 4 the coil spring diminishes in diameter as the indicating shaft turns, and that part of the spring which just clears the nearly cylindrical portion of the body 25, when relaxed, engages said body and is held by it when the spring is strained and as the indicating shaft turns and coils up the spring turn after turn of the spring successively receives this support, the effective length of the spring steadily diminishes and the spring is automatically stiffened as the torque increases and turns the indicating shaft. By properly proportioning or forming the body 25, a change in the effective force or resistance of the spring takes place at any desired rate and enables a practically uniform scale, as shown in Fig. 6, to be secured. A substantially uniform scale may also be secured by automatically varying the efficiency of the means used to exert a torque on the indicating shaft at such a rate that the movement of the indicating shaft becomes practically proportional to the speed to be measured. This result may be secured either by varying the efficiency of the impelling device, which causes the mercury to circulate, or by decreasing the efficiency of the screw wheel 16 as the torque exerted on the indicating shaft increases. Either of these results may be obtained by various constructions and for purposes of illustration I have shown in Fig. 7 one modification in which the efficiency of the impeller will automatically decrease with an increase in speed. In the specific arrangement shown in Fig. 7 the impelling shaft extends into the casing 4 filled with mercury and carries two thin flexible wings or blades 26 extending at right angles to the axis of the impelling shaft between two rounded projections 27 mounted on the end of the impelling shaft, and normally resting against two thin curved stops 28 sufficiently rigid to resist the thrust of the thin blades 26 because set parallel to the direction of movement of the blades with their edges in engagement with the blades. When the impeller is revolved in the casing 4 containing mercury, in the direction indicated by the arrow in Fig. 7, the flexible wings or blades 26 tend to bend backwardly and away from the stops 28 as the speed and the resistance of the mercury increases and thus the diameter of the impeller is virtually reduced until at very high speeds the wings or blades may lie completely back or be wrapped around the parts 27 upon which they are carried. The result of this action is that the efficiency of the impeller or the impelling effect on the mercury diminishes as the speed rises and by proportioning the parts to decrease the impelling effect at the proper rate, the torque exerted on the indicating shaft by an impeller of this type may be made substantially proportional to the speed. The other parts of the instrument may be as shown in Fig. 1, and the ordinary spiral or volute controlling spring may be used. The arrangement shown in Fig. 7 is operative only when revolved in the direction of the arrow, while if the stops 28 are omitted a structure such as is shown in Fig. 14 is produced, which may revolve in either direction.

The circulation of the mercury for the purpose of producing a torque on the indicating shaft may be brought about by structures such as are shown in Figs. 8, 9, 10 and 11, in which, as shown in Fig. 8, the diaphragm plate 15 and the torque producing screw wheel 16, shown in Fig. 1, are combined in one device consisting of a disk 29 carried on the indicating shaft 17 close to the impeller 14 shown in Fig. 1 and provided with openings and vanes made by striking out flaps and bending them back at an angle as shown in Fig. 15. These flaps or vanes and the openings are shown as semicircular, and the openings permit the mercury to flow from the outer edge of the disk 29 over the flaps or vanes to the intake of the impeller and thereby produce a rotative torque on the indicating shaft. Fig. 9 shows a very simple form of impeller 29¹ which may be mounted to turn within a wheel 29² provided with radial vanes 29³ as shown in Fig. 10, or inclined vanes 29⁴, shown in Fig. 11, and mounted on the indicating shaft 17. The blades or vanes on the wheels 29² shown in Figs. 10 and 11 are outside of the impeller arms and the impeller 29¹ which rotates inside of said arms sets the mercury in motion, and the action of the mercury on the vanes of the wheels 29² produces a torque tending to turn the indicating shaft. In the devices shown in Figs. 9, 10 and 11 either element can be used as the impeller and the other as a motor so that if the wheel or disk with vanes shown in Figs. 10 and 11 is driven, the impeller shown in Fig. 9 and mounted within the vanes of the wheel will be carried around and exert a torque on an indicating shaft.

A substantially uniform scale may also be secured with an ordinary volute or spiral controlling spring mounted on a shaft carrying the index and driven from the indicating shaft 17 by means of a small drum or disk 30 mounted on the indicating shaft, and connected by means of a flexible strip or chain to a cam 31 mounted on the shaft connected to the controlling spring. This arrangement is substantially the same as the fusees used in time pieces and the cam is so proportioned that at the start the indicating shaft 17 has a high leverage but as the index moves this leverage decreases at such a rate that the greater torque exerted by the shaft 17 is just sufficient to give a movement to the index which is proportional to the variation in speed.

Although the torque exerted on the indicating shaft by a device embodying my invention is high and remains constant at constant speed, it is sometimes desirable to gear the indicating shaft 17 to another shaft carrying a pointer and a very strong control spring as shown in Fig. 16, and when such an arrangement is adopted a great force may be finally exerted on the control spring, since the indicating shaft 17 can rotate to any extent desired and the power exerted by the shaft can be multiplied to any extent desired by a gear wheel or gear wheels 32.

In the modification shown in Fig. 17 the construction of the device is substantially the same as in Fig. 1 with the exception of the means for transmitting a torque from the driving shaft 6 to the indicator shaft 17, which in this modification comprises a rotatable box 33 mounted on the end of the shaft 6 and steadied by a journal 34 rotating in a bearing in the framework 4 similar to receptacle 4 of Fig. 1, but containing no fluid. The box 33 has lugs 35 projecting from the bottom and is filled with mercury for exerting a torque on the indicating shaft 17 by means of flexible vanes or blades 36 immersed in the mercury and mounted on the end of the indicator shaft which extends into the box 33. The scale is rendered uniform at varying speeds on account of an automatic variation in the area of the vanes 36 exposed to the mercury due to the bending back of the blades to cause a virtual reduction in diameter of the impelling member as the speed increases. The bending of the blades under the pressure of the mercury is controlled by supplemental or supporting leaves or blades 37, shown in Fig. 18, which may vary in number or strength or both to permit the vanes 36 to bend in the manner required to secure a uniform scale. Supports or stops 38 similar to the stops 28 of Fig. 7 prevent injury to the vanes in case the direction of rotation is reversed. The control spring 23 is a spiral spring of the usual type, and the scale secured is very open and uniform, particularly at low speeds, as the skin friction of the mercury on the box assists in getting the mercury in rotation. The only opening from the box is the annular opening of capillary size around the indicating shaft 17, and since the mercury will not flow out through this opening no trouble from leakage is experienced.

My invention may be embodied in many other forms than that shown and described, and I therefore do not wish to be restricted to the exact form shown but intend to cover by the appended claims all changes and modifications within the spirit and scope of my invention.

What I claim as new and desire to secure by Letters Patent of the United States, is,—

1. In a speed indicator, the combination with a movable indicating member and a control spring for restraining the movement of said member, of speed responsive mechanism operatively related to said member and having a variable effective torque producing means so that the efficiency of said mechanism varies with the speed to be measured whereby the movement of said indicating member is substantially proportional to the speed.

2. In a speed indicator, the combination with a movable indicating member and a control spring for restraining the movement of said member, of a driving member operatively connected to said indicating member, a receptacle containing a fluid, and a speed responsive member having a variable effective torque producing means for causing said fluid to exert a torque on said driving member of such an amount that the movement of the indicating member is substantially proportional to the speed to be measured.

3. In a speed indicator, the combination with a movable indicating member and a control spring for restraining the movement of said member, of a liquid container, liquid in said container, a device in said container responsive to the movement of the liquid and connected to the indicating member, and speed responsive mechanism having a variable effective liquid movement producing means for automatically varying with the speed to be measured the effective action of the liquid on said device whereby the movement of the indicating member is substantially proportional to the speed to be measured.

4. In a speed indicator, the combination with a rotatable indicating member and a control spring for restraining the rotation of said member, of a liquid container, a body of liquid in said container, and speed responsive means for moving said liquid to cause it to exert on said member a torque proportional to the speed.

5. In a speed indicator, the combination with a rotatable member and a control spring for restraining the rotation of said member, of a liquid container, a body of liquid in said container and in contact with said member, and speed responsive means having a variable effective area for moving said liquid over said member so as to exert thereon a torque dependent upon the area exposed to the liquid and having means for decreasing the effective area of the speed responsive means exposed to said liquid as the speed increases.

6. A speed indicator comprising a receptacle containing a fluid, a movable indicating member immersed in said fluid, means for restraining the movement of said member, a driving member arranged to set said fluid in motion, means for rotating the driving member at a speed dependent upon the speed to be measured, adjustable vanes on one of said members, and means whereby said vanes are automatically adjusted to vary the effective area of the vanes with the speed to be measured.

7. In a speed indicator the combination with a movable indicating element and a control spring for restraining the movement of said element, of a movable member operatively connected to said indicating element, a receptacle containing a fluid, a speed responsive for causing said fluid to exert a torque on said movable member, and means operatively related to one of said members and in contact with said fluid for automatically varying with the speed to be measured the effective operative relation between such member and the fluid whereby the movement of said indicating element is substantially proportional to the speed.

8. In a speed indicator, the combination with a rotatable indicating member and a control spring for restraining the rotation of said member, of a receptacle containing a fluid in contact with said member, a rotary impeller immersed in said fluid and arranged to exert by its rotation a strain on said member, means for rotating said impeller at a speed proportional to the speed to be measured, and means operatively related to said impeller for so varying its effective diameter that the strain on the member will be proportional to the speed to be measured.

9. In a speed indicator, the combination with a movable indicating member and a control spring for restraining the movement of said member, of a receptacle containing a fluid in contact with said member, a rotary impeller having vanes immersed in said fluid and arranged to set the fluid in motion thereby placing a strain upon said member, means for rotating said impeller at a speed dependent upon the speed to be measured, and means whereby said vanes are automatically adjusted to vary the effective area of the impeller with the speed to be measured.

10. A speed indicator comprising a receptacle containing a fluid, a speed responsive member for setting the fluid in motion, a movable member actuated by the fluid in motion, an indicating element operatively related to said movable member, and means associated with one of said members and in contact with said fluid for automatically varying with the speed to be measured the efficiency of the transmission of motion from the speed responsive member to the movable member.

11. In a speed indicator, the combination with a rotatable member and a control spring for restraining the rotation of said member, of a liquid container, a body of liquid in said container and in contact with said member, a speed responsive member for moving said liquid so as to exert a torque on said rotatable member, and means for automatically varying with the speed to be measured the effective area of one of said members so that the operative efficiency between such member and the liquid is thereby adjusted to render the movement of the rotatable member substantially proportional to the speed.

12. A speed indicator comprising a rotatable member, a control spring for restraining the rotation of said member, a body of fluid having uniform viscosity at ordinary operating temperatures in contact with said member, a receptacle for said fluid, a speed responsive member operatively related to said fluid and means operatively related to one of said members and in contact with said fluid for automatically varying with the speed to be measured the effective coöperative relation between such member and the fluid whereby the movement of said rotatable member is substantially proportional to the speed.

13. A speed indicator comprising a rotatable member, a control spring for restraining the rotation of said member, a body of mercury in contact with said member, a receptacle for said mercury, a speed responsive member for moving the mercury to exert a torque on said rotatable member, and means operatively related to one of said members and in contact with the mercury for automatically varying with the speed to be measured the effective coöperative relation between such member and the mercury whereby the movement of said rotatable member is substantially proportional to the speed.

14. A speed indicator comprising a pump driven at a speed dependent on the speed to be measured, a receptacle containing a fluid, a fluid motor in operative relation with said pump and actuated by the fluid delivered by said pump, a control spring for controlling the movement of said motor, and means whereby the effect of the fluid upon the motor is varied with the speed.

15. A speed indicator comprising a fluid, a rotary impeller shaped to circulate the fluid, a fluid motor element mounted adjacent said impeller, a casing for said impeller and said element and containing the fluid and shaped to direct a flow of the fluid through said motor element, a spring for restraining the rotation of said element, and means for automatically varying with the speed the effect of the fluid upon the motor element.

16. A speed indicator comprising a movable indicating element, a receptacle containing a fluid, a movable member in contact with said fluid and operatively connected to said element, means for resiliently restraining the movement of said rotatable member, and a speed responsive member adapted to set said fluid in motion, one of said members having a variable effective area exposed to said fluid whereby the operative efficiency between such member and the fluid automatically varies with the speed to be measured to render the movement of the indicating element substantially proportional to the speed.

17. A speed indicator comprising a rotatable member, a control spring for restraining the rotation of said member, a body of fluid having uniform viscosity at ordinary operating temperatures in contact with said member, a receptacle for said fluid, and a speed responsive member for moving said fluid to exert a torque on said rotatable member, one of said members having a variable effective area exposed to said fluid whereby the operative efficiency between such member and the fluid automatically varies with the speed to be measured to render the movement of the rotatable member substantially proportional to the speed.

18. A speed indicator comprising a rotatable member, a control spring for restraining the rotation of said member, a body of mercury in contact with said member, a receptacle for said mercury, and a speed responsive member for moving said mercury to exert a torque on the rotatable member, one of said members having a variable effective area exposed to the mercury whereby the operative efficiency between such member and the mercury automatically varies with the speed to be measured to render the movement of the rotatable member substantially proportional to the speed.

19. A speed indicator comprising a movable indicating element, a receptacle containing a fluid, a movable member in contact with said fluid and operatively connected to said element, means for resiliently restraining the movement of said rotatable member, a speed responsive member adapted to set said fluid in motion, and means operatively related to one of said members and in contact with said fluid for automatically varying with the speed to be measured the effective coöperative relation between such member and the fluid whereby the movement of said rotatable member is substantially proportional to the speed.

In witness whereof, I have hereunto set my hand this twenty-ninth day of April 1908.

ELIHU THOMSON.

Witnesses:
JOHN A. MCMANUS, Jr.,
HENRY O. WESTENDARP.

It is hereby certified that in Letters Patent No. 1,095,131, granted April 28, 1914, upon the application of Elihu Thomson, of Swampscott, Massachusetts, for an improvement in "Speed-Indicators," errors appear in the printed specification requiring correction as follows: Page 2, line 41, for the word "or" read *of;* page 5, line 59, before the word "for" insert the word *member;* and that the said Letters Patent should be read with these corrections therein that the same may conform to the record of the case in the Patent Office.

Signed and sealed this 26th day of May, A. D., 1914.

[SEAL.]

R. F. WHITEHEAD,
*Acting Commissioner of Patents.*